United States Patent
Deng et al.

(10) Patent No.: US 12,511,215 B2
(45) Date of Patent: Dec. 30, 2025

(54) POWER SOURCE CONSUMPTION MANAGEMENT APPARATUS FOR FOUR-WAY SERVER

(71) Applicant: SUZHOU METABRAIN INTELLIGENT TECHNOLOGY CO., LTD., Jiangsu (CN)

(72) Inventors: Wenbo Deng, Jiangsu (CN); Xiangtao Kong, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 155 days.

(21) Appl. No.: 18/563,374

(22) PCT Filed: Jan. 27, 2022

(86) PCT No.: PCT/CN2022/074417
§ 371 (c)(1),
(2) Date: Nov. 21, 2023

(87) PCT Pub. No.: WO2023/029375
PCT Pub. Date: Mar. 9, 2023

(65) Prior Publication Data
US 2024/0220385 A1 Jul. 4, 2024

(30) Foreign Application Priority Data
Sep. 3, 2021 (CN) .......................... 202111029188.9

(51) Int. Cl.
G06F 11/30 (2006.01)
G06F 1/28 (2006.01)
G06F 1/3209 (2019.01)

(52) U.S. Cl.
CPC ............ G06F 11/3062 (2013.01); G06F 1/28 (2013.01); G06F 1/3209 (2013.01)

(58) Field of Classification Search
CPC ....... G06F 11/3062; G06F 1/28; G06F 1/3209
See application file for complete search history.

(56) References Cited

U.S. PATENT DOCUMENTS

| | | | |
|---|---|---|---|
| 6,504,266 B1 * | 1/2003 | Ervin | H02J 1/10 307/29 |
| 7,043,650 B2 * | 5/2006 | Bresniker | G06F 1/3287 713/340 |

(Continued)

FOREIGN PATENT DOCUMENTS

| | | |
|---|---|---|
| CN | 101819459 A | 9/2010 |
| CN | 104536554 A | 4/2015 |

(Continued)

*Primary Examiner* — Aurel Prifti
(74) *Attorney, Agent, or Firm* — IPro, PLLC

(57) ABSTRACT

A device for managing a power consumption of a power supply of a four-way server includes a mainboard and a power board. The mainboard is provided with a BMC, a CPLD, a CPU, a PCIE device and a configuration-mode identifying circuit. The power board is provided with a PSU module, an IO expansion chip and a server-size-type circuit. The BMC acquires a server-size type and a power-consumption configuration mode; acquires an overall power-consumption threshold; acquires the rated powers of the PSUs; determines whether the sum of the rated powers of all of the PSUs is less than the overall power-consumption threshold, if yes, issues an alarm and ends the process, and if no, monitors the states of the PSUs in real time; when one of the PSUs is abnormal, determines whether the sum of the rated powers of all of the normal PSUs is less than the overall power-consumption threshold.

16 Claims, 5 Drawing Sheets

(56) References Cited

U.S. PATENT DOCUMENTS

| | | | |
|---|---|---|---|
| 7,203,852 B2* | 4/2007 | Cohen | G06F 1/26 |
| | | | 713/340 |
| 8,390,148 B2* | 3/2013 | Shetty | G06F 1/263 |
| | | | 307/85 |
| 9,454,200 B2* | 9/2016 | Chadha | G06F 1/28 |
| 9,632,552 B2* | 4/2017 | Messick | G06F 11/3062 |
| 9,958,923 B2* | 5/2018 | Bolan | G06F 1/30 |
| 11,243,601 B1* | 2/2022 | Hartwell | G06F 1/28 |
| 12,332,719 B2* | 6/2025 | Zhang | G06F 13/4282 |
| 2005/0283624 A1* | 12/2005 | Kumar | G06F 1/324 |
| | | | 713/300 |
| 2006/0282687 A1 | 12/2006 | Bahali et al. | |
| 2010/0332873 A1* | 12/2010 | Munjal | G06F 1/3203 |
| | | | 713/320 |
| 2011/0066871 A1* | 3/2011 | Farmer | G06F 1/32 |
| | | | 713/340 |
| 2012/0137158 A1* | 5/2012 | Nelluri | H05K 7/1498 |
| | | | 713/340 |
| 2013/0226362 A1* | 8/2013 | Jagadishprasad | G06F 1/3203 |
| | | | 700/297 |
| 2014/0067139 A1* | 3/2014 | Berke | G06F 1/26 |
| | | | 700/291 |
| 2014/0310537 A1* | 10/2014 | Messick | G06F 1/3234 |
| | | | 713/300 |
| 2014/0359331 A1* | 12/2014 | Kuan | G06F 1/263 |
| | | | 713/323 |
| 2015/0370301 A1* | 12/2015 | Bolan | G06F 1/263 |
| | | | 713/322 |
| 2018/0046237 A1* | 2/2018 | Chadha | G06F 1/3234 |
| 2019/0354164 A1* | 11/2019 | Schlude | G06F 1/3206 |
| 2020/0142465 A1* | 5/2020 | Jenne | G06F 1/3206 |
| 2021/0048867 A1* | 2/2021 | Messick | G06F 1/28 |
| 2022/0317759 A1* | 10/2022 | Hartwell | G06F 1/28 |

FOREIGN PATENT DOCUMENTS

| | | |
|---|---|---|
| CN | 110147155 A | 8/2019 |
| CN | 113064479 A | 7/2021 |
| CN | 113467595 A | 10/2021 |

* cited by examiner

POWER SOURCE CONSUMPTION MANAGEMENT APPARATUS FOR FOUR-WAY SERVER

The present application claims the priority of the Chinese patent application filed on Sep. 3, 2021 before the China National Intellectual Property Administration with the application number of 202111029188.9 and the title of "POWER SOURCE CONSUMPTION MANAGEMENT APPARATUS FOR FOUR-WAY SERVER", which is incorporated herein in its entirety by reference.

FIELD

The present application relates to the field of power-supply management of four-way servers and more particularly, to a device for managing a power consumption of a power supply of a four-way server.

BACKGROUND

With the rapid development of the Internet, the quantity of deployed servers is also growing exponentially. The safety reliability of servers, as an important component for data transmission and processing, is particularly important. The power supply is the base for the normal operation of the servers, and the power consumption of the power supply is required to be managed in real time according to the server configuration, to effectively plan and allocate the power supplies consumed by different configurations of the server, and reduce the risk that the power consumption of the server exceeds the load of the power supply to a great extent.

In order to ensure that the overall power consumption does not exceed the rated power supplied by the power-supply module, the conventional solutions usually employ the strategy of power-supply redundancy: in other words, when one of the power supplies damages, the remaining power supplies may still ensure the normal operation of the server. However, that solution is usually applied to servers of a low overall power consumption, such as single-way or double-way servers. Regarding four-way servers with two types of sizes, 2U and 4U, wherein the 2U-size server may be equipped with 2 PSUs, the 4U-size server may be equipped with 4 PSUs, and each of the sizes is compatible with multiple specifications. The overall power consumption of the four-way servers is increased to a great extent as compared with the single-way or double-way servers, and the maximum configuration power consumption highly exceeds the maximum power that an exist single PSU may supply. Therefore, in the four-way servers, the strategy of power-supply redundancy cannot satisfy the demands, and it is required to provide a method for managing the power consumption of the power supply that may support multiple configurations for the four-way servers.

SUMMARY

In order to solve the above problems, the present application provides a device for managing a power consumption of a power supply of a four-way server, which improves the safety reliability of the operation of the four-way server.

The technical solutions of the present application provide a device for managing a power consumption of a power supply of a four-way server, wherein the device includes a mainboard and a power board:

the mainboard is provided with a Baseboard Management Controller (BMC), a Complex Programmable Logic Device (CPLD), a Central Processing Unit (CPU), a Peripheral Component Interconnect Express (PCIE) device and a configuration-mode identifying circuit:

the power board is provided with a Power Supply Unit (PSU) module, an Input/Output (IO) expansion chip and a server-size-type circuit;

a first input terminal of the BMC is connected to an output terminal of the configuration-mode identifying circuit, and acquires an output-logic-level signal of the configuration-mode identifying circuit;

a second input terminal of the BMC is connected to an output terminal of the server-size-type circuit, and acquires an output-logic-level signal of the server-size-type circuit;

one way of a third input terminal of the BMC is connected to PSUs of the PSU module by the IO expansion chip, and determines whether the PSUs are in position and whether the PSUs are normal;

another way is directly connected to the PSUs of the PSU module, and acquires rated powers of the PSUs: and an output terminal of the BMC is connected to an input terminal of the CPLD, and an output terminal of the CPLD is connected to the CPU and the PCIE device.

In some embodiments of the present application, server-size types include a 2U server and a 4U server, each type of the servers has a plurality of power-consumption configuration modes, and different power-consumption configuration modes correspond to different overall power-consumption thresholds: and the BMC determines a server-size type according to the output-logic-level signal of the server-size-type circuit, determines a power-consumption configuration mode according to the output-logic-level signal of the configuration-mode identifying circuit, acquires an overall power-consumption threshold according to the server-size type and the power-consumption configuration mode, and when one of the PSUs is abnormal and a sum of rated powers of all of remaining normal PSUs is less than the overall power-consumption threshold, triggers a throttling mechanism, to reduce an overall power consumption.

In some embodiments of the present application, the BMC further acquires the rated powers of the PSUs, determines whether a sum of the rated powers of all of the PSUs is less than the overall power-consumption threshold, when the sum of the rated powers of all of the PSUs is less than the overall power-consumption threshold, issues an alarm and ends a process, and when the sum of the rated powers of all of the PSUs is not less than the overall power-consumption threshold, monitors states of the PSUs in real time, and determines whether one of the PSUs is abnormal.

In some embodiments of the present application, the BMC, before acquiring the overall power-consumption threshold according to the server-size type and the power-consumption configuration mode, further detects a quantity of actual in-position PSUs, and determines whether the quantity of the actual in-position PSUs is a default installation quantity according to the server-size type, when the quantity of the actual in-position PSUs is the default installation quantity, acquires the rated powers of the PSUs, and when the quantity of the actual in-position PSUs is not the default installation quantity, issues an alarm and ends a process.

In some embodiments of the present application, the server-size-type circuit includes a pull-up resistor or a pull-down resistor:

when the server-size-type circuit includes the pull-up resistor, the output-logic-level signal of the server-size-type circuit is a high level;

when the server-size-type circuit includes the pull-down resistor, the output-logic-level signal of the server-size-type circuit is a low level; and that the BMC determines the server-size type according to the output-logic-level signal of the server-size-type circuit includes;

when the output-logic-level signal of the server-size-type circuit is the low level, the server-size type is the 2U server: and when the output-logic-level signal of the server-size-type circuit is the high level, the server-size type is the 4U server.

In some embodiments of the present application, the configuration-mode identifying circuit includes two pull-up resistors, or two pull-down resistors, or one pull-up resistor and one pull-down resistor:

when the configuration-mode identifying circuit includes two pull-up resistors, the output-logic-level signal of the configuration-mode identifying circuit is [1 1];

when the configuration-mode identifying circuit includes two pull-down resistors, the output-logic-level signal of the configuration-mode identifying circuit is [0 0]: and when the configuration-mode identifying circuit includes one pull-up resistor and one pull-down resistor, the output-logic-level signal of the configuration-mode identifying circuit is [0 1] or [1 0];

wherein (represents a low level, and 1 represents a high level.

In some embodiments of the present application, that the BMC, when one of the PSUs is abnormal and the sum of the rated powers of all of the remaining normal PSUs is less than the overall power-consumption threshold, triggers the throttling mechanism, to reduce the overall power consumption includes:

in response to a sum of rated powers of N−1 PSUs being less than the overall power-consumption threshold, triggering the throttling mechanism, to reduce the overall power consumption when a quantity of abnormal PSUs is ≥1: and in response to a sum of rated powers of N−M PSUs being greater than the overall power-consumption threshold, triggering the throttling mechanism, to reduce the overall power consumption when the quantity of the abnormal PSUs is >M;

wherein N is a default installation quantity of the PSUs, and when the server-size type is the 2U server, N=2: when the server-size type is the 4U server, N=4; and M is the quantity of the abnormal PSUs, and is an integer greater than 1 and less than N.

In some embodiments of the present application, the triggering the throttling mechanism, to reduce the overall power consumption includes: by the BMC, reducing working frequencies of the CPU and the PCIE device by using the CPLD.

The device for managing a power consumption of a power supply of a four-way server according to the present application has the following advantageous effects over the related art: an overall power-consumption threshold is acquired according to the server-size type and the power-consumption configuration mode, the sum of the rated powers of all of the normal PSUs is acquired, the sum of the rated powers of all of the normal PSUs and the magnitude of the overall power-consumption threshold are compared, it is determined whether the PSUs may satisfy the demand on the overall power consumption, and the corresponding treatment is performed timely, thereby realizing the high-efficiency management of the power consumption of the power supply of the four-way server, and improving the safety reliability of the operation of the server.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to these figures without paying creative work.

DETAILED DESCRIPTION

The terms in English involved in the present application will be explained below.

BMC: Baseboard Management Controller;
CPLD: Complex Programmable Logic Device;
PSU: Power Supply Unit: and
PCIE: Peripheral Component Interconnect Express.

In order to enable a person skilled in the art to better comprehend the solutions of the present application, the present application will be described in further detail below with reference to the drawings and the particular embodiments. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In order to ensure that the overall power consumption does not exceed the rated power supplied by the power-supply module, the conventional solutions usually employ the strategy of power-supply redundancy: in other words, when one of the power supplies damages, the remaining power supplies may still ensure the normal operation of the server. However, that solution is usually applied to servers of a low overall power consumption, such as single-way or double-way servers. Regarding four-way servers with two types of sizes, 2U and 4U, wherein the 2U-size server may be equipped with 2 PSUs, the 4U-size server may be equipped with 4 PSUs, and each of the sizes is compatible with multiple specifications. The overall power consumption of the four-way servers is increased to a great extent as compared with the single-way or double-way servers, and the maximum configuration power consumption highly exceeds the maximum power that an exist single PSU may supply. Therefore, in four-way servers, the strategy of power-supply redundancy cannot satisfy the demands, and it is required to provide a method for managing the power consumption of the power supply that may support multiple configurations for four-way servers.

Therefore, the present application provides a method and device for managing a power consumption of a power supply of a four-way server, in which different configurations correspond to different overall power-consumption thresholds. Firstly, an overall power-consumption threshold is acquired according to the server-size type and the power-consumption configuration mode, subsequently the sum of the rated powers of all of the normal PSUs and the magnitude of the overall power-consumption threshold are compared, it is determined whether the PSUs satisfy the demand on the power consumption, and the corresponding treatment is performed.

The First Embodiment

Figure 1:
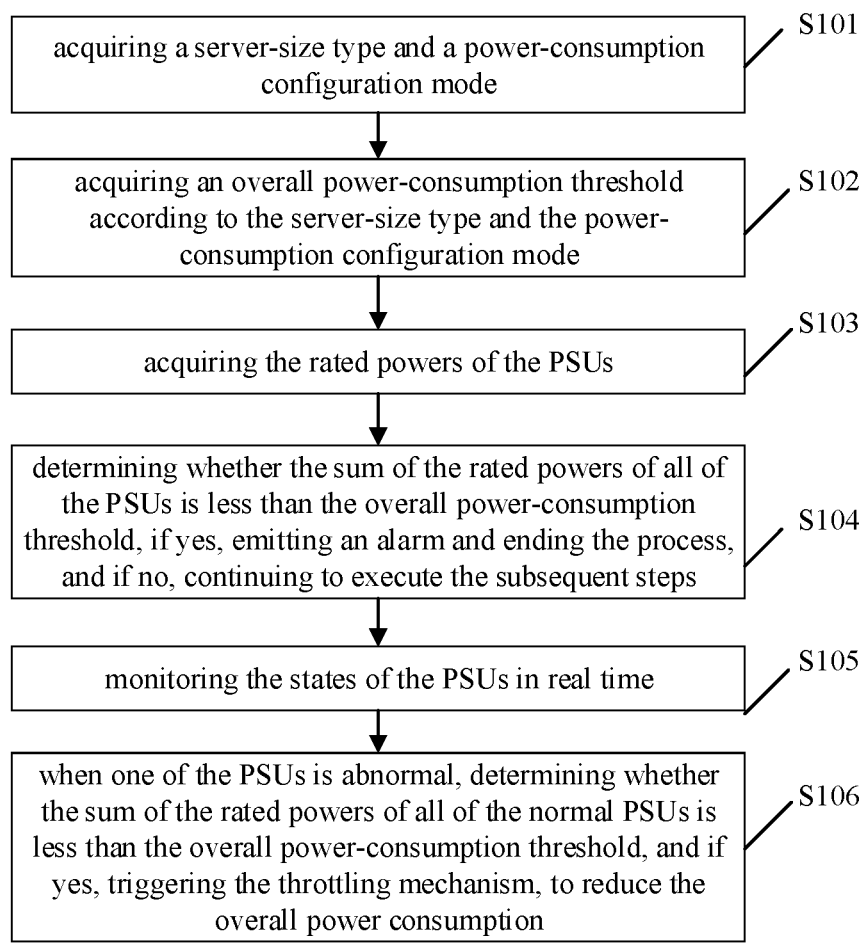
FIG. 1 is a schematic flow chart of a method for managing a power consumption of a power supply of a four-way server according to the first embodiment of the present application.

As shown in FIG. 1, FIG. 1 is a schematic flow chart of a method for managing a power consumption of a power supply of a four-way server according to the first embodiment. The method includes the following steps.

S101: acquiring a server-size type and a power-consumption configuration mode.

It should be noted that server-size types include a 2U server and a 4U server, each type of the servers has a plurality of power-consumption configuration modes, and the different power-consumption configuration modes correspond to different overall power-consumption thresholds.

S102: acquiring an overall power-consumption threshold according to the server-size type and the power-consumption configuration mode.

S103: acquiring the rated powers of the PSUs.

S104: determining whether the sum of the rated powers of all of the PSUs is less than the overall power-consumption threshold, if yes, issuing an alarm and ending the process, and if no, continuing to execute the subsequent steps.

When the sum of the rated powers of all of the PSUs is less than the overall power-consumption threshold, then the power of the PSUs that the user is currently equipped with is low, and cannot satisfy the demand of the configuration, and it is required to replace with PSUs of a higher power. Therefore, an alarm is issued and the process is ended.

S105: monitoring the states of the PSUs in real time.

The states of the PSUs refer to that the PSUs are normal or that the PSUs are abnormal.

S106: when one of the PSUs is abnormal, determining whether the sum of the rated powers of all of the normal PSUs is less than the overall power-consumption threshold, and if yes, triggering the throttling mechanism, to reduce the overall power consumption.

When a PSU is abnormal, or, in other words, when at least one of the PSUs is abnormal, the power of the remaining normal PSUs might not satisfy the demand of the complete device. Therefore, it is timely determined whether the sum of the rated powers of all of the normal PSUs is less than the overall power-consumption threshold. When the sum of the rated powers of all of the normal PSUs is less than the overall power-consumption threshold, that indicates that all of the normal PSUs cannot satisfy the demand on the power consumption, and it is required to reduce the overall power consumption, in order to prevent abnormality of an entire device.

In the method for managing a power consumption of a power supply of a four-way server according to the present embodiment, an overall power-consumption threshold is acquired according to the server-size type and the power-consumption configuration mode, the sum of the rated powers of all of the normal PSUs is acquired, the sum of the rated powers of all of the normal PSUs and the magnitude of the overall power-consumption threshold are compared, it is determined whether the PSUs may satisfy the demand on the overall power consumption, and the corresponding treatment is performed timely, thereby realizing the high-efficiency management of the power consumption of the power supply of the four-way server, and improving the safety reliability of the operation of the server.

The Second Embodiment

Given that the 2U server should be installed with 2 PSUs, and the 4U server should be installed with 4 PSUs, when the quantity of the initially installed PSUs is incorrect, an alarm should also be issued timely.

Figure 2:
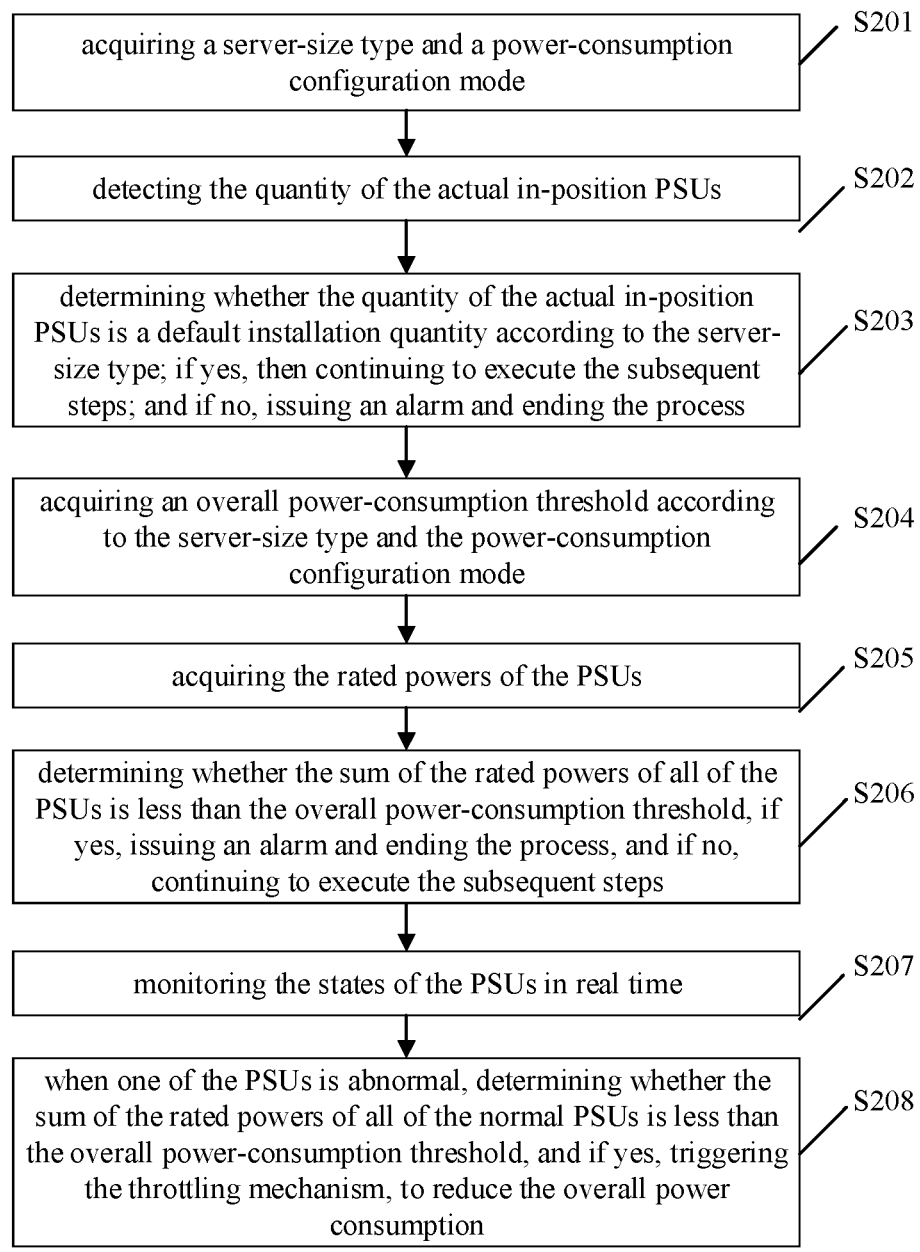
FIG. 2 is a schematic flow chart of a method for managing a power consumption of a power supply of a four-way server according to the second embodiment of the present application.

On the basis of that the second embodiment provides a method for managing a power consumption of a power supply of a four-way server, which may detect the quantity of the installed PSUs at an initial stage. As shown in FIG. 2. FIG. 2 is a schematic flow chart of a method for managing a power consumption of a power supply of a four-way server according to the second embodiment. The method includes the following steps.

S201: acquiring a server-size type and a power-consumption configuration mode.

S202: detecting the quantity of the actual in-position PSUs.

S203: determining whether the quantity of the actual in-position PSUs is a default installation quantity according to the server-size type: if yes, then continuing to execute the subsequent steps: and if no, issuing an alarm and ending the process.

In some embodiments, the 2U server is installed with 2 PSUs by default, and the 4U server is installed with 4 PSUs by default.

S204: acquiring an overall power-consumption threshold according to the server-size type and the power-consumption configuration mode.

S205: acquiring the rated powers of the PSUs.

S206: determining whether the sum of the rated powers of all of the PSUs is less than the overall power-consumption threshold, if yes, issuing an alarm and ending the process, and if no, continuing to execute the subsequent steps.

S207: monitoring the states of the PSUs in real time.

S208: when one of the PSUs is abnormal, determining whether the sum of the rated powers of all of the normal PSUs is less than the overall power-consumption threshold, and if yes, triggering the throttling mechanism, to reduce the overall power consumption.

In the method for managing a power consumption of a power supply of a four-way server according to the present embodiment, an overall power-consumption threshold is acquired according to the server-size type and the power-consumption configuration mode, the sum of the rated powers of all of the normal PSUs is acquired, the sum of the rated powers of all of the normal PSUs and the magnitude of the overall power-consumption threshold are compared, it is determined whether the PSUs may satisfy the demand on the overall power consumption, and the corresponding treatment is performed timely, thereby realizing the high-efficiency management of the power consumption of the power supply of the four-way server, and improving the safety reliability of the operation of the server. Moreover, the quantity of the actual in-position PSUs may be detected at the initial stage, and in the case in which the in-position quantity is incorrect, an alarm is issued timely, whereby the user reinstalls the PSUs.

The Third Embodiment

In order to acquire the server-size type and the power-consumption configuration mode, the mainboard and the power board may be provided with the relevant electric circuits to acquire the server-size type and the power-consumption configuration mode respectively.

Figure 3:
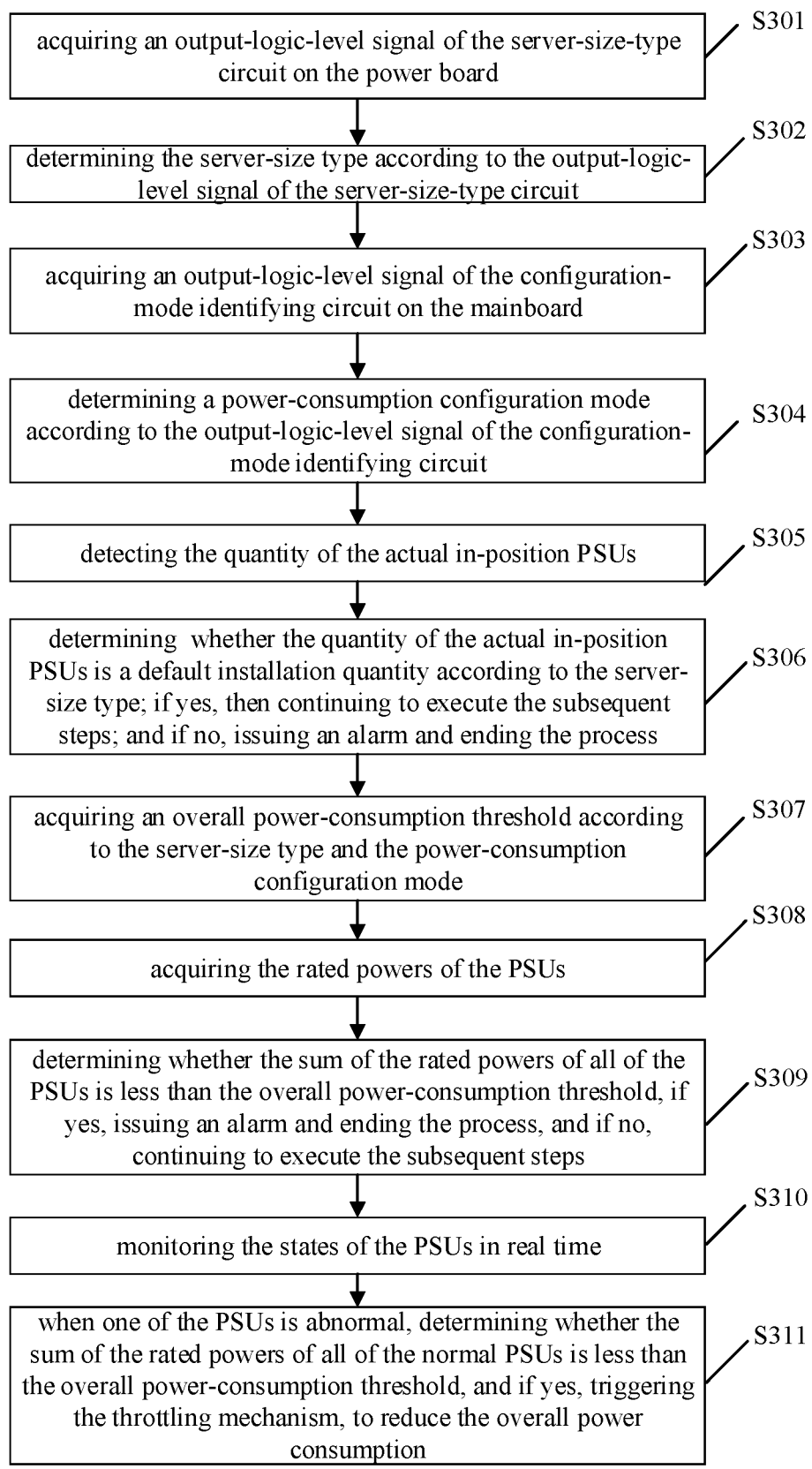
FIG. 3 is a schematic flow chart of a method for managing a power consumption of a power supply of a four-way server according to the third embodiment of the present application.

As shown in FIG. 3. FIG. 3 is a schematic flow chart of a method for managing a power consumption of a power supply of a four-way server according to the third embodiment. The method includes the following steps.

S301: acquiring an output-logic-level signal of the server-size-type circuit on the power board.

S302: determining the server-size type according to the output-logic-level signal of the server-size-type circuit.

The server-size-type circuit includes a pull-up resistor or a pull-down resistor. The output-logic-level signal of the server-size-type circuit is controlled by using the pull-up resistor or the pull-down resistor. It should be noted that the server-size-type circuit is provided on the power board. When the server-size-type circuit includes the pull-up resistor, i.e., performing a pull-up treatment on the power board, the output-logic-level signal of the server-size-type circuit is a high level. When the server-size-type circuit includes the pull-down resistor, i.e., performing a pull-down treatment on the power board, the output-logic-level signal of the server-size-type circuit is a low level.

In some embodiments, the power board of the 2U server undergoes a pull-down treatment, and the power board of the 4U server undergoes a pull-up treatment. Correspondingly, when the output-logic-level signal of the server-size-type circuit is a low level, the server-size type is the 2U server. When the output-logic-level signal of the server-size-type circuit is a high level, the server-size type is the 4U server.

S303: acquiring an output-logic-level signal of the configuration-mode identifying circuit on the mainboard.

S304: determining a power-consumption configuration mode according to the output-logic-level signal of the configuration-mode identifying circuit.

As similar to the server-size-type circuit, the configuration-mode identifying circuit includes a pull-up resistor and/or a pull-down resistor, and, by a pull-up or pull-down treatment, outputs a high or low level to identify the different power-consumption configuration modes.

In order to support the multiple power-consumption configuration modes, in some implementations, the configuration-mode identifying circuit includes two resistors, and the two resistors are configured as a pull-up resistor or a pull-down resistor according to particular demands. Correspondingly, the output-logic-level signal of the configuration-mode identifying circuit has four modes of [0 0], [0 1], [1 0] and [1 1], wherein 0 represents a low level, and 1 represents a high level.

In some embodiments, when the configuration-mode identifying circuit includes two pull-up resistors, the output-logic-level signal of the configuration-mode identifying circuit is [1 1]:

when the configuration-mode identifying circuit includes two pull-down resistors, the output-logic-level signal of the configuration-mode identifying circuit is [0 0]: and when the configuration-mode identifying circuit includes one pull-up resistor and one pull-down resistor, the output-logic-level signal of the configuration-mode identifying circuit is [0 1] or [1 0].

Therefore, each of the server-size types corresponds to four power-consumption configuration modes. As shown in Table 1, table 1 is a table of the correspondence relation between the different configurations of the four-way server.

TABLE 1

Table of the correspondence relation between the different configurations of the four-way server

| Configuration | BoardID | CONFIG_ID[1] | CONFIG_ID[0] |
|---|---|---|---|
| 2U configuration 0 | 0 | 0 | 0 |
| 2U configuration 1 | 0 | 0 | 1 |
| 2U configuration 2 | 0 | 1 | 0 |
| 2U configuration 3 | 0 | 1 | 1 |
| 4U configuration 0 | 1 | 0 | 0 |
| 4U configuration 1 | 1 | 0 | 1 |
| 4U configuration 2 | 1 | 1 | 0 |
| 4U configuration 3 | 1 | 1 | 1 | wherein BoardID refers to the output-logic-level signal of the server-size-type circuit, and CONFIG_ID[1] and CONFIG_ID[0] refer to the output-logic-level signals of the configuration-mode identifying circuit.

Each of the configurations corresponds to one overall power-consumption threshold, and the correspondence relation between the particular configurations and the overall power-consumption thresholds may be predetermined and stored in the correspondence-relation table. After the server-size type and the power-consumption configuration mode have been acquired, the overall power-consumption threshold may be determined according to the correspondence-relation table.

The configuration-mode identifying circuit is provided on the mainboard. It should be noted that the user provides the materials for the server-size-type circuit and the configuration-mode identifying circuit on the mainboard and the power board according to demands, thereby determining the different overall power-consumption thresholds. After the mainboard and the power board are produced and left the factory, the server-size type and the power-consumption configuration mode are decided. For example, when the 2U is configured as 0, then the mainboard is provided with two pull-down resistors for a pull-down treatment, and the power board is provided with one pull-down resistor for a pull-down treatment.

S305: detecting the quantity of the actual in-position PSUs.

S306: determining whether the quantity of the actual in-position PSUs is a default installation quantity according to the server-size type: if yes, then continuing to execute the subsequent steps: and if no, issuing an alarm and ending the process.

In some embodiments, the 2U server is installed with 2 PSUs by default, and the 4U server is installed with 4 PSUs by default.

S307: acquiring an overall power-consumption threshold according to the server-size type and the power-consumption configuration mode.

S308: acquiring the rated powers of the PSUs.

S309: determining whether the sum of the rated powers of all of the PSUs is less than the overall power-consumption threshold, if yes, issuing an alarm and ending the process, and if no, continuing to execute the subsequent steps.

S310: monitoring the states of the PSUs in real time.

S311: when one of the PSUs is abnormal, determining whether the sum of the rated powers of all of the normal PSUs is less than the overall power-consumption threshold, and if yes, triggering the throttling mechanism, to reduce the overall power consumption.

In the method for managing a power consumption of a power supply of a four-way server according to the present embodiment, an overall power-consumption threshold is acquired according to the server-size type and the power-consumption configuration mode, the sum of the rated powers of all of the normal PSUs is acquired, the sum of the rated powers of all of the normal PSUs and the magnitude of the overall power-consumption threshold are compared, it is determined whether the PSUs may satisfy the demand on the overall power consumption, and the corresponding treatment is performed timely, thereby realizing the high-efficiency management of the power consumption of the power supply of the four-way server, and improving the safety reliability of the operation of the server. Moreover, the quantity of the actual in-position PSUs may be detected at the initial stage, and in the case in which the in-position quantity is incorrect, an alarm is issued timely, whereby the user reinstalls the PSUs. Furthermore, the server-size type is acquired by using the server-size-type circuit, and the power-consumption configuration mode is acquired by using the configuration-mode identifying circuit, which is realized by using the pull-up resistor and the pull-down resistor, and has a simple structure, easy implementation, and a low cost.

The Fourth Embodiment

Given that, usually, the rated powers of the PSUs in one system are equal, or, in other words, in one system PSUs of the same specification are used, when it is determined whether the sum of the rated powers of all of the normal PSUs is less than the overall power-consumption threshold, it may be determined by detecting the quantity of the abnormal PSUs whether the sum of the rated powers of all of the normal PSUs is less than the overall power-consumption threshold.

On the basis of the first embodiment, the second embodiment or the third embodiment, the present embodiment provides a method for managing a power consumption of a power supply of a four-way server, which includes when one of the PSUs is abnormal, determining whether the sum of the rated powers of all of the normal PSUs is less than the overall power-consumption threshold, and if yes, triggering the throttling mechanism, to reduce the overall power consumption. The method includes the following steps.

The first step: in response to a sum of rated powers of N−1 PSUs being less than the overall power-consumption threshold, triggering the throttling mechanism when a quantity of abnormal PSUs is ≥1, to reduce the overall power consumption.

When the sum of rated powers of N−1 PSUs is less than the overall power-consumption threshold, the configuration does not support the strategy of power-supply redundancy, and when the PSUs of the quantity ≥1 cannot normally operate, the throttling mechanism is triggered.

The second step: in response to a sum of rated powers of N−M PSUs being greater than the overall power-consumption threshold, triggering the throttling mechanism when the quantity of the abnormal PSUs is >M, to reduce the overall power consumption.

It should be noted that N is a default installation quantity of the PSUs, and when the server-size type is the 2U server. N=2: when the server-size type is the 4U server. N=4: and M is the quantity of the abnormal PSUs, and is an integer greater than 1 and less than N.

When the sum of rated powers of N−M PSUs is greater than the overall power-consumption threshold, the configuration supports the strategy of power-supply redundancy, and when the PSUs of the quantity of at least M+1 cannot normally operate, the throttling mechanism is triggered.

In the present embodiment, the triggering the throttling mechanism, to reduce the overall power consumption includes reducing the working frequencies of the hardware devices by using the CPLD. The hardware devices include the CPU and the PCIE device.

The method for managing a power consumption of a power supply of a four-way server according to the present embodiment can, when acquiring, at the initial stage, the overall power-consumption threshold and the sum of the rated powers of the PSUs, determine whether the redundancy strategy is supported, and, subsequently, by monitoring the quantity of the abnormal PSUs, may determine whether the demand by the overall power consumption is satisfied, to increase the efficiency of the monitoring.

The Fifth Embodiment

The fifth embodiment provides a device for managing a power consumption of a power supply of a four-way server, which is configured to implement the method for managing a power consumption of a power supply of a four-way server stated above.

Figure 4:
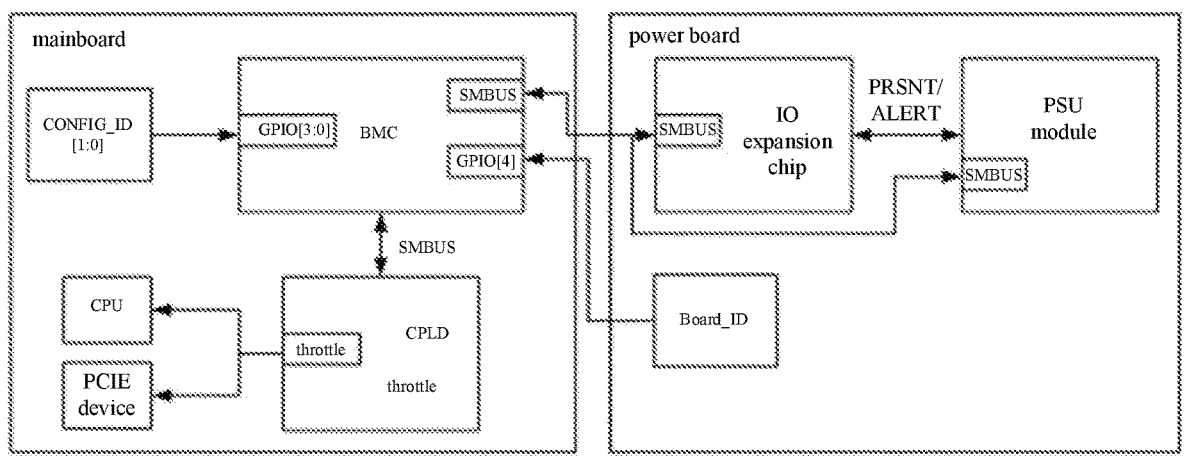
FIG. 4 is a schematic structural block diagram of a device for managing a power consumption of a power supply of a four-way server according to the fifth embodiment of the present application.

As shown in FIG. 4. FIG. 4 is a schematic structural block diagram of a device for managing a power consumption of a power supply of a four-way server according to the fifth embodiment. The device includes a mainboard and a power board. In the figure. Board_ID is the server-size-type circuit, and CONFIG_ID[1:0] is the configuration-mode identifying circuit.

The mainboard is provided with a BMC, a CPLD, a CPU, a PCIE device and a configuration-mode identifying circuit. The power board is provided with a PSU module, an IO expansion chip and a server-size-type circuit.

A first input terminal of the BMC is connected to an output terminal of the configuration-mode identifying circuit, and acquires an output-logic-level signal of the configuration-mode identifying circuit.

A second input terminal of the BMC is connected to an output terminal of the server-size-type circuit, and acquires an output-logic-level signal of the server-size-type circuit.

One way of a third input terminal of the BMC is connected to PSUs of the PSU module by the IO expansion chip, and determines whether the PSUs are in position and whether the PSUs are normal. Another way is directly connected to the PSUs of the PSU module, and acquires rated powers of the PSUs. It should be noted that the BMC is connected to the IO expansion chip and the PSUs by a smbus bus. The BMC acquires a PRSNT/ALERT signal of the PSUs from the IO expansion chip, wherein the PRSNT signal is a PSU in-position signal, and the ALERT signal is a PSU alarming signal.

An output terminal of the BMC is connected to an input terminal of the CPLD, and an output terminal of the CPLD is connected to the CPU and the PCIE device.

The device realizes the management on the power consumption of the power supply by the following steps.

In the first step, the BMC, after the initialization is completed, firstly determines whether the server is the 2U server or the 4U server currently by reading the Board_ID. When it is the 2U server, the quantity of the installed PSUs is 2 by default. When it is the 4U server, the quantity of the installed PSUs is 4 by default. Simultaneously, the BMC reads the PRSNT signal corresponding to the PSUs on the power board by using the smbus bus, and determines whether it is consistent with the quantity of the default installed PSUs. When they are not consistent, then the BMC directly triggers an alarm, to inform the user to normally install the missing PSU.

In the second step, the BMC determines the current power-consumption configuration mode by reading the CONFIG_ID[1:0], and compares the overall power-consumption threshold of the current power-consumption configuration mode and the rated powers of the PSUs read by using the smbus, to establish the power-supply-management solution of the current configuration.

1) When the total power consumption corresponding to N PSUs is <the overall power-consumption threshold of the current configuration, then the BMC directly triggers an alarm, to inform that the power of the PSUs that the user is currently equipped with is low, and cannot satisfy the demand of the configuration, and it is required to replace with PSUs of a higher power. (N represents the quantity of the current default installed PSUs).

2) When the total power corresponding to (N−1) PSUs is <the overall power-consumption threshold of the current configuration, then the configuration does not support the strategy of power-supply redundancy, and when the PSUs of the quantity ≥1 cannot normally operate, the BMC notifies the CPLD to trigger the throttling mechanism. Taking the 2U server as an example, it is equipped with 2 PSUs by default. When the rated power of 1 PSU is <the overall power-consumption threshold of the current configuration, or, in other words, 1 PSU cannot satisfy the demand on the power consumption of the configuration, the strategy of power-supply redundancy is not supported. Accordingly, when 1 PSU cannot normally operate, the throttling mechanism is triggered.

3) When the total power consumption corresponding to (N−M) PSUs is >the overall power-consumption threshold of the current configuration, then the configuration supports the strategy of power-supply redundancy (herein N represents the quantity of the default installed PSUs, and M represents the quantity of the PSUs that cannot normally operate). In this scene, when at least M+1 PSUs cannot normally operate, the BMC notifies the CPLD to trigger the throttling mechanism. Taking the 4U server as an example, N=4. Assuming that, in the configuration 1, 2 PSUs cannot operate, in this case, the power supplied by the remaining 2 PSUs is still greater than the overall power-consumption threshold of the configuration 1 (M=2), and the BMC does not notify the CPLD to trigger the mechanism of reducing the overall power consumption. Merely when 3 or more PSUs cannot normally operate simultaneously, the BMC notifies the CPLD to trigger the throttling mechanism.

The device for managing a power consumption of a power supply of a four-way server according to the present embodiment is configured to implement the method for managing a power consumption of a power supply of a four-way server stated above. Therefore, some embodiments of the device may refer to the embodiments of the method for managing a power consumption of a power supply of a four-way server stated above, and, therefore, its particular embodiments may refer to the corresponding description on the embodiments of the parts, and are not described in detail herein.

Furthermore, because the device for managing a power consumption of a power supply of a four-way server according to the present embodiment is configured to implement the method for managing a power consumption of a power supply of a four-way server stated above, its effects correspond to the effects of the method stated above, and are not discussed further herein.

The Sixth Embodiment

Figure 5:
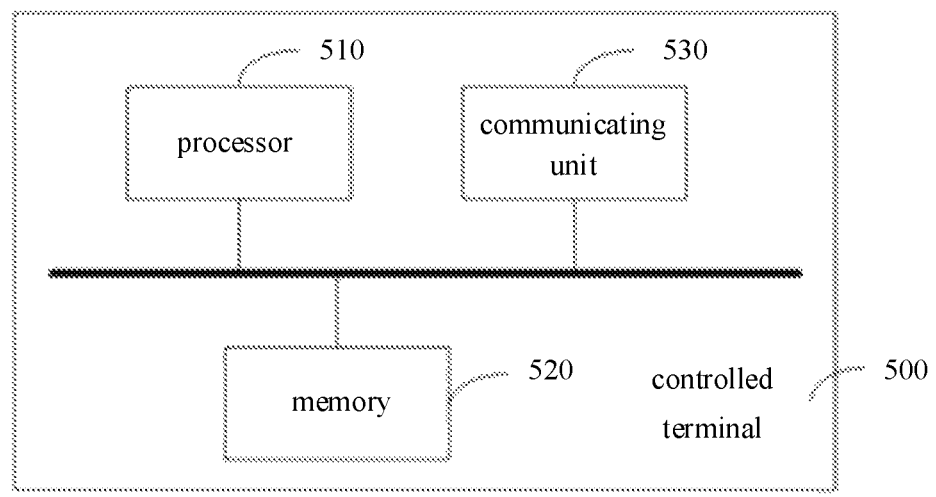
FIG. 5 is a schematic structural diagram of a terminal according to the sixth embodiment of the present application.

FIG. 5 is a schematic structural diagram of a terminal device 500 according to an embodiment of the present application. The terminal device 500 may be configured to implement the method for managing a power consumption of a power supply of a four-way server according to the embodiments of the present application.

The terminal device 500 may include a processor 510, a memory 520 and a communicating unit 530. Those components communicate via one or more buses. A person skilled in the art may understand that the structure of the server shown in the figure does not limit the present application. The server may be of a bus-shaped structure, or a star-shaped structure, and may include more or fewer components than those shown in the figure, or a combination of some of the components, or a different component arrangement.

The memory 520 may be configured to store an instruction executed by the processor 510. The memory 520 may be embodied by any type of volatile or non-volatile storage terminals or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The executed instruction in the memory 520, when executed by the processor 510, enables the terminal 500 to perform some or all of the steps of the above process embodiments.

The processor 510 is the controlling center of the storage terminal, is connected to the parts of the entire electronic terminal by various interfaces and lines, and, by executing the software programs and/or modules stored in the memory 520, and invoking the data stored in the memory, performs the various functions of the electronic terminal and/or processes the data. The processor may be formed by integrated circuits (referred to for short as IC): for example, it may be formed by singly encapsulated ICs, and may also be formed by multiple connected encapsulated ICs that have the same function or different functions.

The communicating unit 530 is configured to establish communication ways, so that the storage terminal may communicate with other terminals, to receive the user data sent by the other terminals or send the user data to the other terminals.

The Seventh Embodiment

The present application further provides a computer storage medium, wherein the computer storage medium may store a program, and the program, when executed, may include some or all of the steps of the embodiments of the present application. The storage medium may be a diskette, an optical disk, a Read-Only Memory (referred to for short as ROM), a Random Access Memory (referred to for short as RAM) and so on.

A person skilled in the art may clearly know that the technique according to the embodiments of the present application may be implemented by means of software plus a necessary generic hardware platform. On the basis of such a comprehension, the substance of the technical solutions of the embodiments of the present application, or the part thereof that makes a contribution over the prior art, may be embodied in the form of a software product. The computer software product is stored in a storage medium, for example, various media that may store a program code such as a USB flash disk, a mobile hard disk drive, a Read-Only Memory (ROM), a Random Access Memory (RAM), a diskette and an optical disk, and contains multiple instructions configured to enable a computer terminal (which may be a personal computer, a server, a second terminal, a network terminal and so on) to perform all or some of the steps of the method according to the embodiments of the present application.

The same or similar parts of the embodiments of the description may refer to each other. In some embodiments, regarding the terminal embodiments, because they are substantially similar to the process embodiments, they are described simply, and the related parts may refer to the description on the process embodiments.

In the embodiments of the present application, it should be understood that the disclosed system, device and method may be implemented in other manners. For example, the above-described device embodiments are merely illustrative. For example, the division between the units is merely a division in the logic functions, and in the actual implementation there may be another mode of division. For example, multiple units or components may be combined or may be integrated into another system, or some of the features may be omitted, or not implemented. Additionally, the coupling or direct coupling or communicative connection between the illustrated or discussed components may be via interfaces or the indirect coupling or communicative connection between the devices or units, and may be electric, mechanical or in other forms.

The units that are described as separate components may or may not be physically separate, and the components that are displayed as units may or may not be physical units: in other words, they may be located at the same one location, and may also be distributed to a plurality of network units. Some or all of the units may be selected according to actual demands to realize the purposes of the solutions of the embodiments.

Furthermore, the functional units according to the embodiments of the present application may be integrated into one processing unit, or the units may also separately physically exist, or two or more of the units may also be integrated into one unit.

The contents disclosed above are merely alternative embodiments of the present application, but the present application is not limited thereto. All of the variations without an inventive step and the improvements and modifications made without departing from the principle of the present application that a person skilled in the art may envisage should fall within the protection scope of the present application.

The invention claimed is:

1. A device for managing a power consumption of a power supply of a four-way server, wherein the device comprises a mainboard and a power board;

the mainboard is provided with a Baseboard Management Controller (BMC), a Complex Programmable Logic Device (CPLD), a Central Processing Unit (CPU), a Peripheral Component Interconnect Express (PCIE) device and a configuration-mode identifying circuit;

the power board is provided with a Power Supply Unit (PSU) module, an Input/Output (IO) expansion chip and a server-size-type circuit;

a first input terminal of the BMC is connected to an output terminal of the configuration-mode identifying circuit, to acquire an output-logic-level signal of the configuration-mode identifying circuit, the BMC is configured to determine a power-consumption configuration mode according to the output-logic-level signal of the configuration-mode identifying circuit;

a second input terminal of the BMC is connected to an output terminal of the server-size-type circuit, to acquire an output-logic-level signal of the server-size-type circuit, the BMC is further configured to determine a server-size type according to the output-logic-level signal of the server-size-type circuit;

one way of a third input terminal of the BMC is connected to PSUs of the PSU module by the IO expansion chip, and to determine whether the PSUs are in position and whether the PSUs are normal;

another way of the third input terminal of the BMC is directly connected to the PSUs of the PSU module, to acquire rated powers of the PSUs;

the BMC is further configured to acquire an overall power-consumption threshold according to the server-size type and the power-consumption configuration mode; and an output terminal of the BMC is connected to an input terminal of the CPLD, to notify the CPLD to trigger a throttling mechanism when one of the PSUs is abnormal and a sum of rated powers of all of remaining normal PSUs is less than the overall power-consumption threshold; and an output terminal of the CPLD is connected to the CPU and the PCIE device, to reduce an overall power consumption when the CPLD triggers the throttling mechanism.

2. The device for managing a power consumption of a power supply of a four-way server according to claim 1, wherein server-size types comprise a 2 rack units (2U) server and a 4 rack units (4U) server, each type of servers has a plurality of power-consumption configuration modes, and different power-consumption configuration modes correspond to different overall power-consumption thresholds.

3. The device for managing a power consumption of a power supply of a four-way server according to claim 1, wherein after the rated powers of the PSUs are acquired, the BMC further determines whether a sum of the rated powers of all of the PSUs is less than the overall power-consumption threshold, when the sum of the rated powers of all of the PSUs is less than the overall power-consumption threshold, issues an alarm and ends above steps, and when the sum of the rated powers of all of the PSUs is not less than the overall power-consumption threshold, monitors states of the PSUs in real time, and determines whether one of the PSUs is abnormal.

4. The device for managing a power consumption of a power supply of a four-way server according to claim 1, wherein the BMC, before acquiring the overall power-consumption threshold according to the server-size type and the power-consumption configuration mode, further detects a quantity of actual in-position PSUs, and determines whether the quantity of the actual in-position PSUs is a default installation quantity according to the server-size type, when the quantity of the actual in-position PSUs is the default installation quantity, acquires the rated powers of the PSUs, and when the quantity of the actual in-position PSUs is not the default installation quantity, issues an alarm and ends above steps.

5. The device for managing a power consumption of a power supply of a four-way server according to claim 2, wherein the server-size-type circuit comprises a pull-up resistor or a pull-down resistor;
   when the server-size-type circuit comprises the pull-up resistor, the output-logic-level signal of the server-size-type circuit is a high level;
   when the server-size-type circuit comprises the pull-down resistor, the output-logic-level signal of the server-size-type circuit is a low level; and
   that the BMC determines the server-size type according to the output-logic-level signal of the server-size-type circuit comprises:
   when the output-logic-level signal of the server-size-type circuit is the low level, the server-size type is the 2U server; and
   when the output-logic-level signal of the server-size-type circuit is the high level, the server-size type is the 4U server.

6. The device for managing a power consumption of a power supply of a four-way server according to claim 5, wherein the configuration-mode identifying circuit comprises two pull-up resistors, or two pull-down resistors, or one pull-up resistor and one pull-down resistor;
   when the configuration-mode identifying circuit comprises two pull-up resistors, the output-logic-level signal of the configuration-mode identifying circuit is [1 1];
   when the configuration-mode identifying circuit comprises two pull-down resistors, the output-logic-level signal of the configuration-mode identifying circuit is [0 0]; and
   when the configuration-mode identifying circuit comprises one pull-up resistor and one pull-down resistor, the output-logic-level signal of the configuration-mode identifying circuit is [0 1] or [1 0];
   wherein 0 represents the low level, and 1 represents the high level.

7. The device for managing a power consumption of a power supply of a four-way server according to claim 6, wherein that the BMC notifies the CPLD to trigger the throttling mechanism when one of the PSUs is abnormal and the sum of the rated powers of all of the remaining normal PSUs is less than the overall power-consumption threshold, to reduce the overall power consumption comprises:
   in response to a sum of rated powers of N–1 PSUs being less than the overall power-consumption threshold, triggering the throttling mechanism, to reduce the overall power consumption when a quantity of abnormal PSUs is ≥1; and
   in response to a sum of rated powers of N–M PSUs being greater than the overall power-consumption threshold, triggering the throttling mechanism, to reduce the overall power consumption when the quantity of the abnormal PSUs is >M;
   wherein N is a default installation quantity of the PSUs, and when the server-size type is the 2U server, N=2; when the server-size type is the 4U server, N=4; and M is the quantity of the abnormal PSUs, and is an integer greater than 1 and less than N.

8. The device for managing a power consumption of a power supply of a four-way server according to claim 7, wherein reduce the overall power consumption when the CPLD triggers the throttling mechanism comprises: by the BMC, reducing working frequencies of the CPU and the PCIE device by using the CPLD.

9. The device for managing a power consumption of a power supply of a four-way server according to claim 7, wherein the BMC is connected to the IO expansion chip by a smbus bus.

10. A method for managing a power consumption of a power supply of a four-way server, comprising:
    acquiring a server-size type and a power-consumption configuration mode;
    acquiring an overall power-consumption threshold according to the server-size type and the power-consumption configuration mode;
    acquiring rated powers of Power Supply Units (PSUs);
    determining whether a sum of the rated powers of all of the PSUs is less than an overall power-consumption threshold, when the sum of the rated powers of all of the PSUs is less than the overall power-consumption threshold, issuing an alarm and ending above steps, and when the sum of the rated powers of all of the PSUs is not less than the overall power-consumption threshold, continuing to execute subsequent steps;
    monitoring states of the PSUs in real time;
    when one of the PSUs is abnormal, determining whether a sum of rated powers of all of normal PSUs is less than the overall power-consumption threshold, and when the sum of the rated powers of all of the normal PSUs is less than the overall power-consumption threshold, triggering the throttling mechanism, to reduce the overall power consumption; and
    wherein after the step of acquiring a server-size type and a power-consumption configuration mode, the method further comprises:
    detecting a quantity of actual in-position PSUs;
    determining whether the quantity of the actual in-position PSUs is a default installation quantity according to the server-size type; when the quantity of the actual in-position PSUs is the default installation quantity, continuing to execute subsequent steps; and when the quantity of the actual in-position PSUs is not the default installation quantity, issuing an alarm and ending above steps.

11. A method for managing a power consumption of a power supply of a four-way server, comprising:
    acquiring a server-size type and a power-consumption configuration mode;
    acquiring an overall power-consumption threshold according to the server-size type and the power-consumption configuration mode;
    acquiring rated powers of Power Supply Units (PSUs);
    determining whether a sum of the rated powers of all of the PSUs is less than an overall power-consumption threshold, when the sum of the rated powers of all of the PSUs is less than the overall power-consumption threshold, issuing an alarm and ending above steps, and when the sum of the rated powers of all of the PSUs is not less than the overall power-consumption threshold, continuing to execute subsequent steps;
    monitoring states of the PSUs in real time;
    when one of the PSUs is abnormal, determining whether a sum of rated powers of all of normal PSUs is less than the overall power-consumption threshold, and when the sum of the rated powers of all of the normal PSUs is less than the overall power-consumption threshold, triggering the throttling mechanism, to reduce the overall power consumption; and wherein the step of acquiring a server-size type and a power-consumption configuration mode comprises:

acquiring an output-logic-level signal of a server-size-type circuit on a power board;

determining the server-size type according to the output-logic-level signal of the server-size-type circuit;

acquiring an output-logic-level signal of a configuration-mode identifying circuit on a mainboard; and determining the power-consumption configuration mode according to the output-logic-level signal of the configuration-mode identifying circuit.

12. The method for managing a power consumption of a power supply of a four-way server according to claim 11, wherein the server-size-type circuit comprises a pull-up resistor or a pull-down resistor, and the method further comprises:

when the server-size-type circuit comprises the pull-up resistor, performing a pull-up treatment on the power board, so that the output-logic-level signal of the server-size-type circuit is a high level; and when the server-size-type circuit includes the pull-down resistor, performing a pull-down treatment on the power board, so that the output-logic-level signal of the server-size-type circuit is a low level.

13. The method for managing a power consumption of a power supply of a four-way server according to claim 12, wherein the step of determining the server-size type according to the output-logic-level signal of the server-size-type circuit comprises:

when the output-logic-level signal of the server-size-type circuit is the low level, determining the server-size type as a 2 rack units (2U) server; and when the output-logic-level signal of the server-size-type circuit is the high level, determining the server-size type as a 4 rack units (4U) server.

14. The method for managing a power consumption of a power supply of a four-way server according to claim 11, wherein the configuration-mode identifying circuit comprises two pull-up resistors, or two pull-down resistors, or one pull-up resistor and one pull-down resistor;

the step of determining the power-consumption configuration mode according to the output-logic-level signal of the configuration-mode identifying circuit comprises:

when the configuration-mode identifying circuit comprises two pull-up resistors, determining the output-logic-level signal of the configuration-mode identifying circuit as [1 1];

when the configuration-mode identifying circuit comprises two pull-down resistors, determining the output-logic-level signal of the configuration-mode identifying circuit as [0 0]; and when the configuration-mode identifying circuit comprises one pull-up resistor and one pull-down resistor, determining the output-logic-level signal of the configuration-mode identifying circuit as [0 1] or [1 0];

wherein 0 represents the low level, and 1 represents the high level.

15. The method for managing a power consumption of a power supply of a four-way server according to claim 10, wherein the step of, when one of the PSUs is abnormal, determining whether a sum of rated powers of all of normal PSUs is less than the overall power-consumption threshold, and when the sum of the rated powers of all of the normal PSUs is less than the overall power-consumption threshold, triggering the throttling mechanism, to reduce the overall power consumption comprises:

in response to a sum of rated powers of N−1 PSUs being less than the overall power-consumption threshold, triggering the throttling mechanism, to reduce the overall power consumption when a quantity of abnormal PSUs is ≥1; and in response to a sum of rated powers of N−M PSUs being greater than the overall power-consumption threshold, triggering the throttling mechanism, to reduce the overall power consumption when the quantity of the abnormal PSUs is >M;

wherein N is a default installation quantity of the PSUs, and when the server-size type is the 2U server, N=2; when the server-size type is the 4U server, N=4; and M is the quantity of the abnormal PSUs, and is an integer greater than 1 and less than N.

16. The method for managing a power consumption of a power supply of a four-way server according to claim 10, wherein the step of triggering the throttling mechanism, to reduce the overall power consumption comprises:

reducing working frequencies of a Central Processing Unit (CPU) and a Peripheral Component Interconnect Express (PCIE) device by using a Complex Programmable Logic Device (CPLD).

\* \* \* \* \*